(12) United States Patent
Corghi

(10) Patent No.: US 6,718,646 B2
(45) Date of Patent: Apr. 13, 2004

(54) SELF-CENTERING DEVICE FOR SUPPORTING HEADS FOR CHECKING THE WHEEL ATTITUDE OF MOTOR VEHICLES IN GENERAL

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 10/145,112

(22) Filed: May 15, 2002

(65) Prior Publication Data

US 2002/0170195 A1 Nov. 21, 2002

(30) Foreign Application Priority Data

May 15, 2001 (IT) .................................... RE2001U0016

(51) Int. Cl.[7] ..................... G01D 21/00; G01B 21/22
(52) U.S. Cl. ..................... 33/520; 33/203.18; 33/644
(58) Field of Search ..................... 33/520, 600, 644, 33/203, 203.18, 203.19, 203.2; 73/146

(56) References Cited

U.S. PATENT DOCUMENTS

| | | | | |
|---|---|---|---|---|
| 4,377,038 A | * | 3/1983 | Ragan | 33/203.18 |
| 4,569,140 A | * | 2/1986 | Hobson | 33/203.18 |
| 4,800,651 A | * | 1/1989 | Hanlon | 33/203.18 |
| 5,024,001 A | * | 6/1991 | Borner et al. | 33/203.18 |
| 5,056,231 A | * | 10/1991 | Alusick et al. | 33/203.18 |
| 5,369,602 A | * | 11/1994 | Naas et al. | 33/600 |
| 5,446,967 A | * | 9/1995 | Gender | 33/203.18 |
| 5,489,979 A | * | 2/1996 | Corghi | 33/203.18 |

FOREIGN PATENT DOCUMENTS

IT  224605  5/1991

* cited by examiner

*Primary Examiner*—Diego Gutierrez
*Assistant Examiner*—Yaritza Guadalupe
(74) *Attorney, Agent, or Firm*—Browdy and Neimark, P.L.L.C.

(57) ABSTRACT

A self-centering device for supporting heads for checking the attitude of motor vehicle wheels, comprising two parallel cylindrical bars (3) between which there is positioned a parallel rod (6) having two opposite-handed threaded portions with which two sliders (5) are coupled and are arranged to slide along said bars with movement towards and away from each other, said sliders each being provided with a pair of clamps (12) arranged to engage the wheel rim of the wheel to be tested, each individual clamp being connected to the respective slider by way of means (14) which enable its distance from the slider to be adjusted.

9 Claims, 4 Drawing Sheets

SELF-CENTERING DEVICE FOR SUPPORTING HEADS FOR CHECKING THE WHEEL ATTITUDE OF MOTOR VEHICLES IN GENERAL

This invention concerns the field of motor vehicle wheel attitude checking in general, and more particularly relates to a self-centering device for supporting the heads or sensors for checking and measuring said attitude.

Said heads and their method of use will not be described, being extraneous to the objects of the invention.

Said heads are associated with the wheel rims of a motor vehicle by using appropriate self-centering devices, a typical example of which is fully described in Italian Model No. 224605 in the name of the same Applicant.

The device of said document comprises four mutually parallel clamps, usually of double acting type, i.e. able to engage the bead retention flange of a wheel rim either from the inside, typically in the case of sheet steel wheel rims, or from the outside, typically in the case of alloy wheel rims.

Said clamps are arranged in a substantially cross arrangement about the centre of a flat frame comprising two parallel side-by-side bars on which two sliders are slidingly mounted.

Each slider supports two clamps, said clamps projecting from the plane in which said two bars lie.

Between the two bars there is a parallel rod which is rotatably mounted on said frame and presents two threaded portions with opposite handed threads on which said two sliders are engaged, so that the respective pairs of clamps can be made to approach or withdraw from each other on the basis of the nominal diameter of the wheel rim.

Said rod is rotated by at least one terminal knob, which is fixed to one of its ends outside the overall contour of the frame.

A projecting pin is also provided for supporting an attitude checking head, the pin being perpendicular to the frame and located on the opposite side of it to that occupied by the clamps.

Said pin lies at the centre of the device, and is preferably aligned with the wheel rim axis.

As explained hereinbefore, to arrange the four clamps on the wheel rim circumference, the distance between the two clamp sliders has to be increased or decreased, this being done by rotating the threaded rod.

As wheel rims of considerably different nominal diameters ranging from 8–10 to 20–22 inches or more are currently available, devices of at least two different sizes must be to hand because the device suitable for the smaller diameters cannot be used for the larger diameters, and vice versa.

In particular, such known devices have proved inconvenient from their overall size aspect, because when performing out-of-plane or off-centre operations or checks on wheel rims typically of relatively small diameter, which operations require the wheel to be rotated on a surface, the device may come into contact with said surface, so preventing such checks from being carried out.

The main object of this invention is to provide a single device which can be associated with the entire range of commercially available wheel rims.

A further object is to provide a self-centering device able to avoid contact with the ground when out-of-plane or off-centre checks are being made, even in the case of relatively small nominal diameter wheel rims.

Another object is to attain the aforesaid objects within the context of a simple, rational, reliable and durable construction.

Said objects are attained by virtue of the characteristics indicated in the claims.

Basically, according to the invention, each clamp is connected to the respective slider by means which enable the distance between the clamp and slider to be varied as required.

By virtue of this provision, all the objects of the invention are attained.

In this respect, to change the self-centering device from that configuration suitable for example for wheel rims of large diameter, for example 22 inches or more, to that suitable for wheel rims of small diameter, for example 8 inches, the clamps have merely to be moved closer to the sliders, and the rod operated through the distance necessary to engage the clamps with the wheel rim.

Moreover, while maintaining the sliders in a determined configuration, for example practically at their maximum distance apart, the position of the devices can be adapted to relatively different wheel rim diameters, for example from 16 to 22 inches.

As will be seen, adjusting the position of the clamps becomes a very simple matter, and by virtue of the said adjustment the device of the invention enables off-centre and out-of-plane operations and checks to be carried out without problems arising, even on very small wheels which at that moment rest on the ground.

The said device is shaped and dimensioned in such a manner as to be able to independently support the attitude checking head or sensor, i.e. without any accessories being required.

The constructional characteristics and merits of the invention will be apparent from the ensuing detailed description given with reference to the figures of the accompanying drawings in which.

Figure 1:
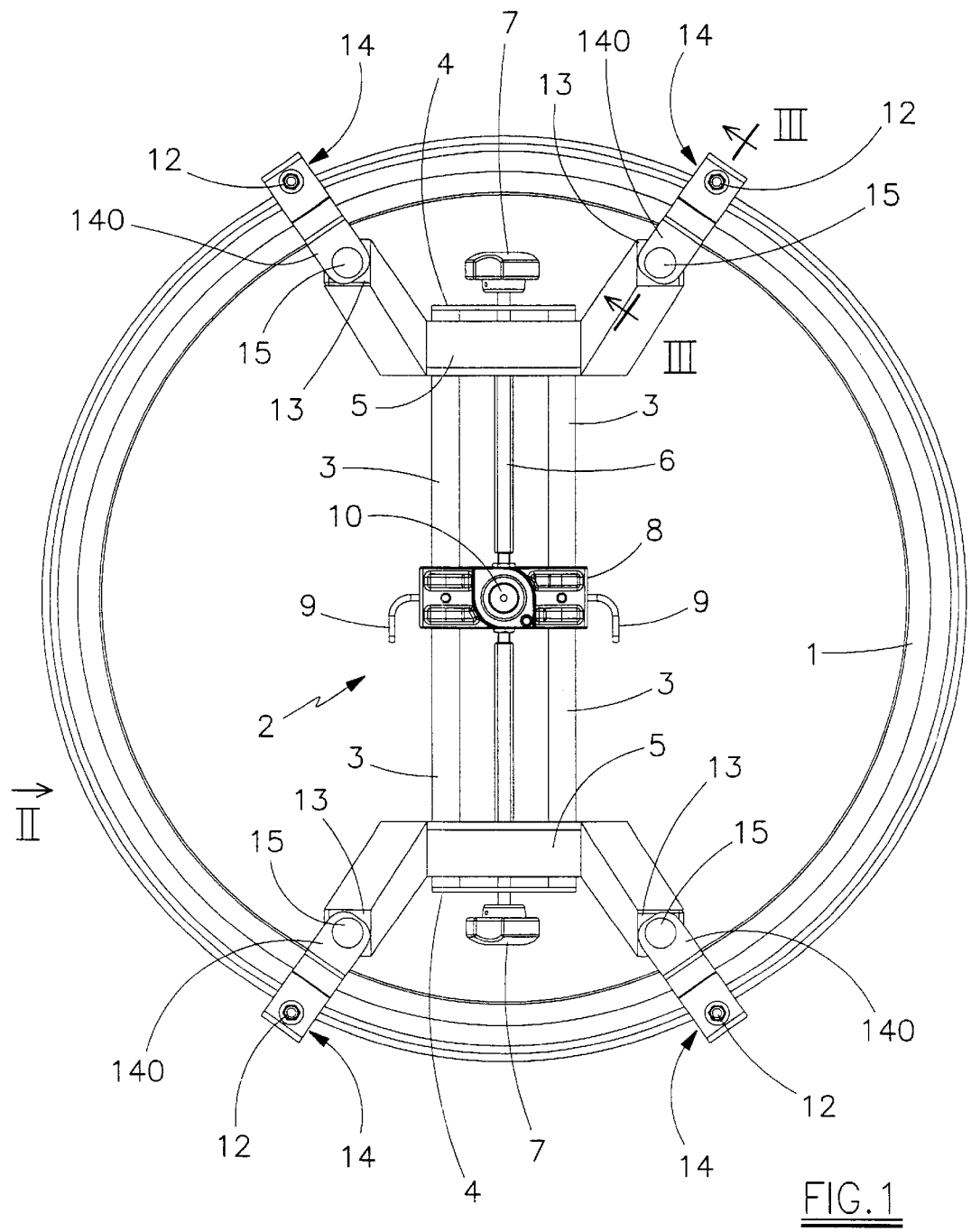
FIG. 1 is a front view showing a device of the invention in its virtually maximum extension configuration coupled to a large-diameter wheel rim.
Figure 2:
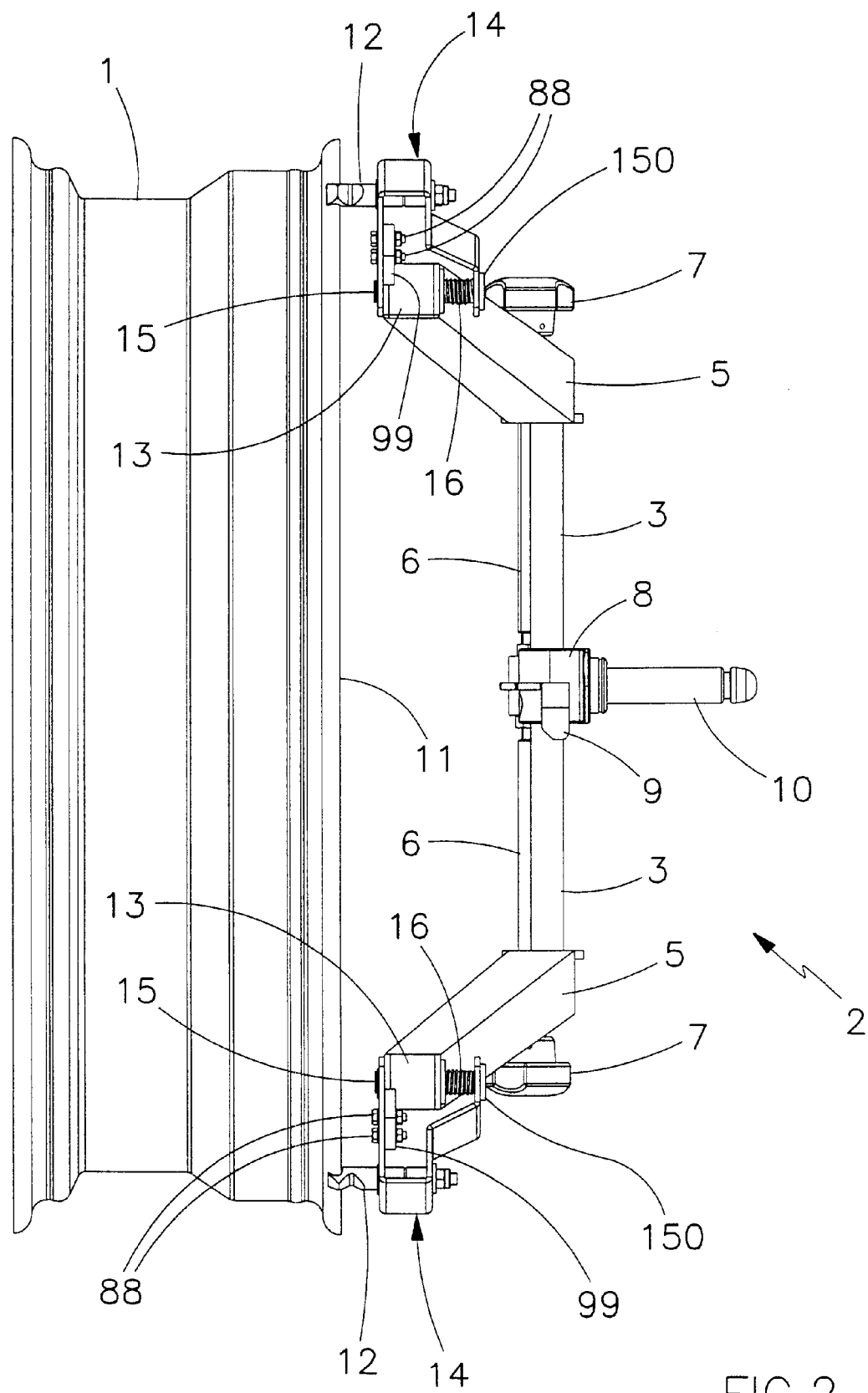
FIG. 2 is a view in the direction II of FIG. 1.

Said figures, and in particular FIGS. 1 and 2, illustrate a motor vehicle wheel rim 1, shown without its tire for reasons of simplicity.

To the (with reference to the motor vehicle) outer bead retention flange 11 of said wheel rim 1 there is coupled a self-centering device indicated overall by the reference numeral 2.

The device 2 comprises two parallel cylindrical bars 3 connected together by two transverse end plates 4, and on which two sliders 5 are slidingly mounted.

Said sliders 5 are shaped as a U-piece with diverging arms (see FIG. 1) inclined on that side of the device which is to face the wheel rim 1 (see FIG. 2).

Between the bars 3 there is provided a parallel rod 6 which is rotatably mounted and axially locked on said end plates 4, and presents two opposite-handed threaded portions with which said sliders 5 are centrally engaged, it being provided with two terminal operating knobs 7.

On said bars 3 there is mounted a member 8 which supports a central perpendicular pin 10 for holding a sensor for checking the vehicle attitude, and is provided with a known guillotine device 9, for the constructional and operational details of which reference should be made to the document stated in the introduction.

The self-centering device 2 is also provided with four usual double acting clamps 12 which are arranged substantially as a cross and are supported in pairs by the sliders 5 via the means of the invention, described hereinafter.

Figure 3:
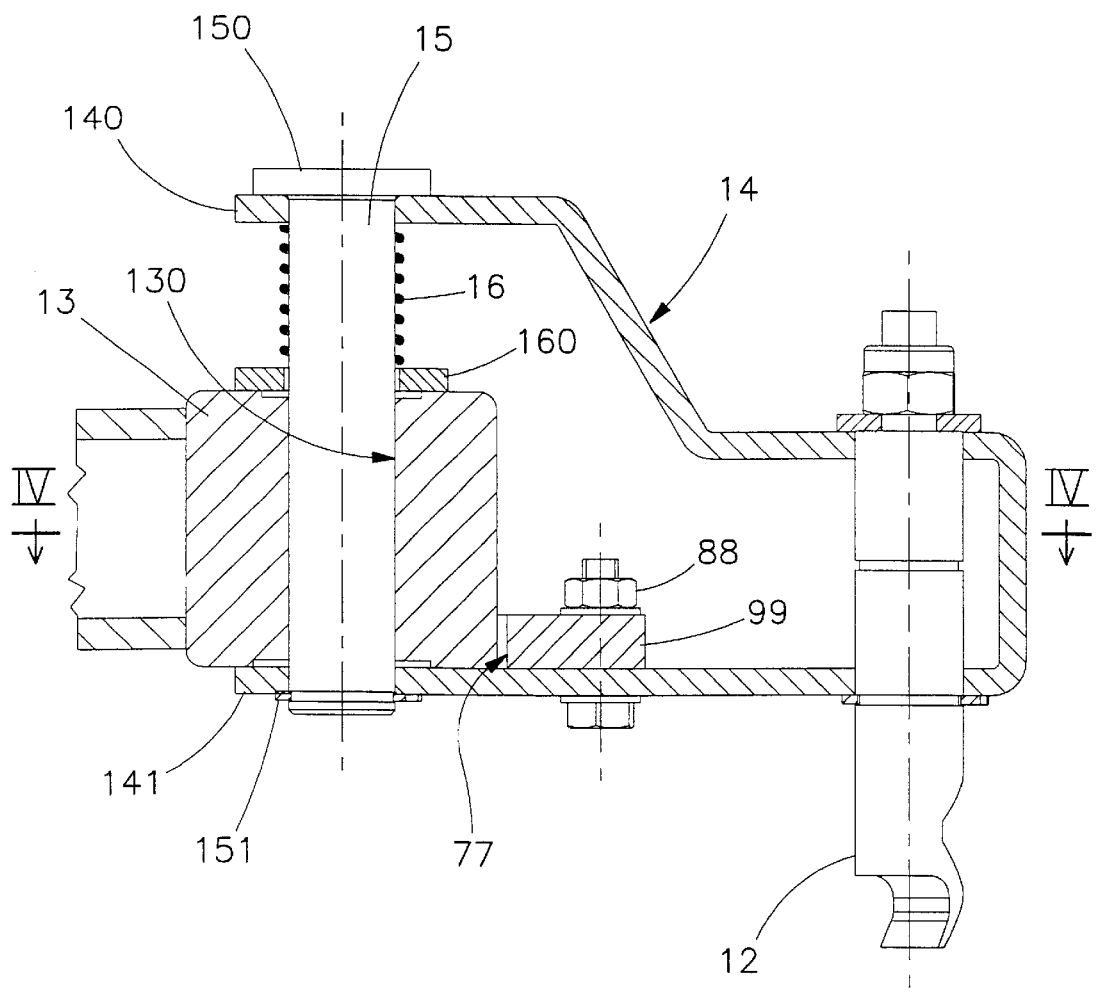
FIG. 3 is the section III—III of FIG. 1 on an enlarged scale.
Figure 4:
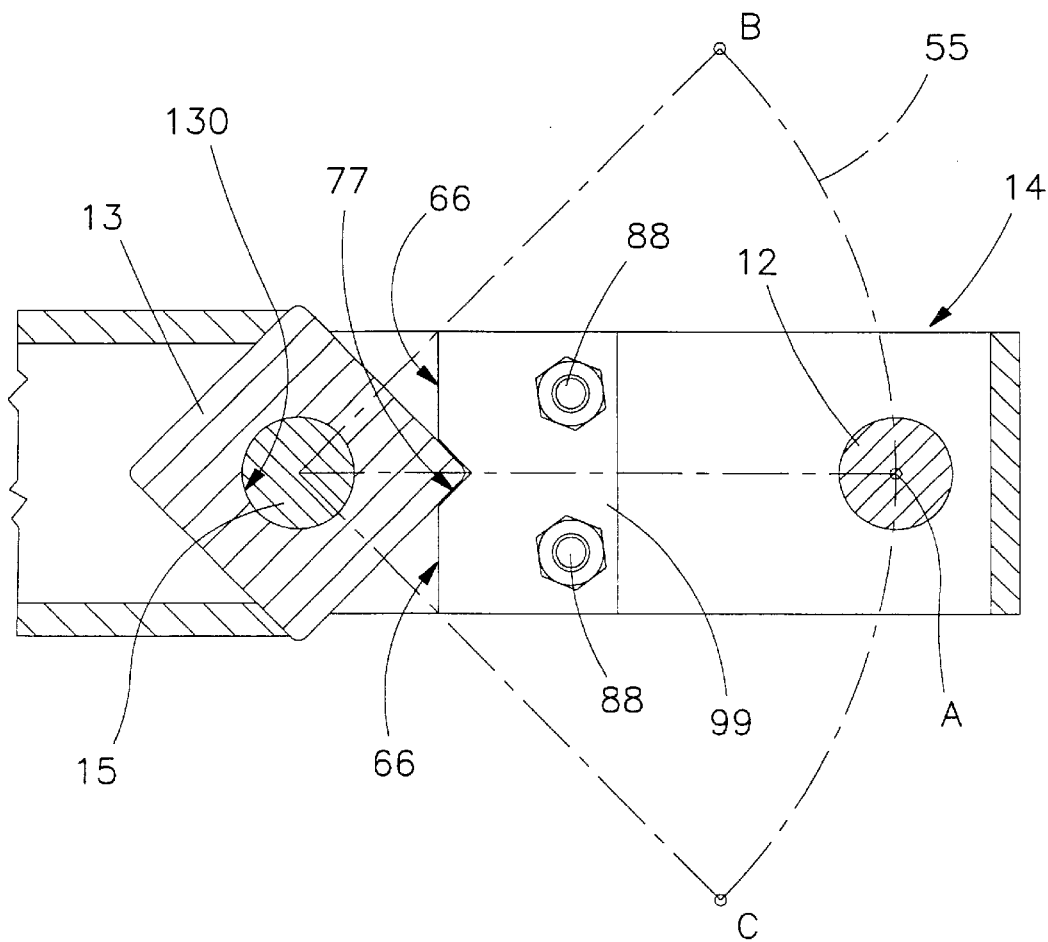
FIG. 4 is the section IV—IV of FIG. 3.

As shown in FIGS. 3 and 4, these means comprise a square-based parallelepiped block 13 which has its longitudinal axis parallel to that of the clamp 12 and is fixed at its end to a diverging arm of the slider 5.

The said block 13 presents a through coaxial hole 130 which holds a rotatable and slidable pin 15 supporting a profiled swivel arm 14, on the free end of which the clamp 12 is mounted.

In detail (see FIG. 3), said arm 14 is formed by bending a metal plate to form a sort of fork, the closed end of which carries said clamp 12 and the open end of which is slackly mounted on the block 13.

The parallel sides 140 and 141 of said open end present two aligned holes in which said pin 15 is inserted and is axially locked against said sides 140, 141 by an enlarged endpiece 150 and a retaining ring 151.

On said pin 15 there is also mounted a compressed spring 16 lying between the side 140 and a washer 160 which rests against the block 13.

The block 13 constitutes the fixed element of an adequately adjustable prismatic coupling system for selecting and locking the angular position of the arm 14, with which the movable element of the system is associated.

Said movable element consists of a rectangular plate 99 fixed by two bolts 88 onto the inner face of said side 141, in proximity to the block 13 (see FIGS. 3 and 4).

That edge 66 of the plate 99 which faces the block 13 presents a central recess 77 shaped as a symmetrical V with a 90° angle at its vertex.

The flat part of said edge 66 represents the region by which the plate 99 rests against the lateral faces of the block 13, the recess 77 in the edge 66 forming the seat by which the plate 99 engages the corners of the block 13.

In FIG. 4 the reference numeral 55 indicates a circumferential arc swept by the axis of the clamp 12 when swivelling about the pin 15, and A, B and C represent three of the possible stable positions which the clamp 12 can occupy relative to the slider 5 whatever the position of this latter along the bars 3.

Said positions A, B, C etc. are spaced apart by an angle of 45°, these corresponding to a different distance of the clamp 12 from the respective slider 5.

The operation of the invention is evident.

To change the position of the clamp 12, the arm 14 is merely slid relative to the block 13 against the thrust of the spring 16 until the plate 99 and block 13 disengage from each other, after which the arm 14 can be swivelled in one direction or the other, and then released so that the block 13 and plate re-engage as already described.

What is claimed is:

1. A self-centering device for supporting heads for checking the attitude of motor vehicle wheels, comprising two parallel cylindrical bars (3) between which there is positioned a parallel rod (6) having two opposite-handed threaded portions with which two sliders (5) are coupled and are arranged to slide along said bars with movement towards and away from each other, each of said sliders being provided with a respective pair of clamps (12) arranged to engage the wheel rim of the wheel to be tested, wherein said device further comprises means connecting each clamp to the respective slider, said means being operable for adjusting the distance between the clamps of the same pair provided on a respective slider.

2. A device as claimed in claim 1, wherein said means comprise a projecting arm which at its free end carries a respective clamp and at its opposite end is connected to the slider on an axis perpendicular to the plane in which the cylindrical bars lie, between said arm and said slider there being interposed a coupling system for selecting and locking the angular position of the arm.

3. A device as claimed in claim 2, wherein said axis is provided by a pin which is rigid with said arm and is rotatably mounted and axially slidable in a seat in the slider, means being provided to constantly force said arm elastically in the direction in which said coupling system is engaged.

4. A device as claimed in claim 3, wherein said elastic means consist of a thrust spring mounted on said pin and lying between said seat and said arm.

5. A device as claimed in claim 1, wherein said means comprise a projecting arm which at its free end carries the clamp and at its opposite end is connected to the slider, between said arm and said slider there being interposed a coupling system for selecting and locking the position of the arm relative to the slider.

6. A device as claimed in claim 2, wherein said system comprises a square member fixed to the slider and positioned concentric with the seat for said pin, and a facing flat wall provided on said arm and interrupted by a recess shaped as a V with a 90° angle at its vertex, the flat part and the recessed part of said wall being arranged to make contact respectively with a face and with a corner of said square member, as required.

7. A device as claimed in claim 1, wherein said device is shaped and dimensioned such as not to interfere with the ground when coupled to the rim of a wheel positioned on the ground.

8. A device as claimed in claim 7, wherein said device is shaped and dimensioned such as to enable out-of-plane and off-centre operations or checks to be effected on small-diameter wheels resting on the ground.

9. A device as claimed in claim 1, wherein said device is shaped and dimensioned such as to be able to carry the attitude checking sensor or head without assistance, for any of the nominal diameters of wheel rims currently available.

* * * * *